G. M. CARTER.
INTERNAL EXPANDING BRAKE.
APPLICATION FILED MAY 16, 1919.
1,385,482.
Patented July 26, 1921.
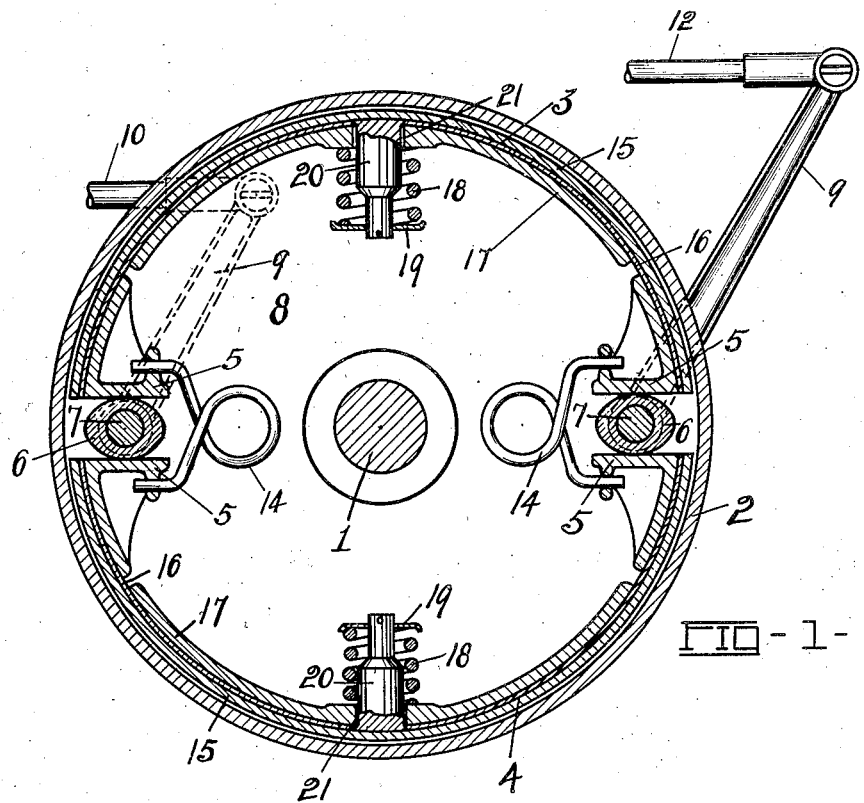
FIG-1-
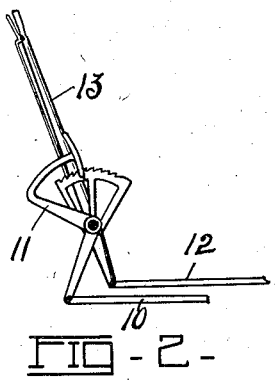
FIG-2-
INVENTOR
George M. Carter,
By Owen, Owen & Crampton,
His attys.

UNITED STATES PATENT OFFICE.

GEORGE M. CARTER, OF FINDLAY, OHIO, ASSIGNOR OF ONE-HALF TO RALPH H. ROSENBERG, OF FINDLAY, OHIO.

INTERNAL EXPANDING BRAKE.

1,385,482.  Specification of Letters Patent.  Patented July 26, 1921.

Application filed May 16, 1919. Serial No. 297,597.

*To all whom it may concern:*

Be it known that I, GEORGE M. CARTER, a citizen of the United States, and a resident of Findlay, in the county of Hancock and State of Ohio, have invented a certain new and useful Internal Expanding Brake; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to brakes of the internal expanding type and has for its primary object the provision of a simple brake of this class which is double expanding in its character and is capable of operation by separate levers for service and emergency purposes.

A further object of my invention is the provision of a brake of this class which is provided with double operating means, one of which is capable of operating as an adjusting means for the brake to compensate for wear and to enable a more positive braking action to be applied through the other operating means.

The invention is fully described in the following specification, and while, in its broader aspect, it is capable of embodiment in numerous forms, a preferred embodiment thereof is illustrated in the accompanying drawings, in which, Figure 1 is a vertical section of a brake mechanism embodying the invention taken transverse to its axis, and Fig. 2 is an elevation of the customary brake pedal and emergency brake lever of a motor vehicle to which the different operating arms of the brake mechanism are connected.

Referring to the drawings, 1 designates the drive shaft for a wheel or other rotatable member (not shown), and 2 the customary brake drum, which is secured to the side of the wheel or rotatable member for rotation therewith, as well understood in the art.

Two semi-circular brake segments 3 and 4, are mounted internally of the drum 2 in opposed relation, or at opposite sides of the drum axis, and adjacent ends thereof are spaced apart and each provided at its inner edge with a bracket or thrust member 5.

An expanding cam 6 for the brake segment is interposed between each pair of brackets 5, and either of these cams, when rocked from the normal position shown, effects a brake applying expansion of the segments to place them in frictional binding engagement with the internal periphery of the drum 2. The shaft 7 of each expanding cam is journaled in a stationary frame part or anchoring member which may comprise the part 8 of an axle housing which is customarily employed to close the open side of the brake drum, as well understood in the art.

An operating arm 9 is fixed to each shaft 7, one arm being connected through a rod 10, or in any other suitable or well known manner, to the customary service brake pedal or lever 11 of the associated vehicle, and the other arm being connected through a rod 12, or in any other suitable or well known manner, to the emergency brake lever 13 of the vehicle, so that either expanding cam may be operated independently of the other.

With this arrangement it is possible to easily and quickly adjust the brake segments relative to the drum to compensate for wear or looseness of the brake parts by simply moving the emergency lever to one or the other of its stop catch positions and permitting it to remain in such adjusted position under running conditions, thereby effecting a sufficient rocking or adjustment of the emergency brake cam 6 to compensate for wear or looseness in the brake parts.

Springs 14 connect and yieldingly hold the ends of the brake segments against expansion, the springs shown each comprising a coil and having its ends engaged with the respective thrust members 5 with which engaged.

Each brake segment 3 and 4 is composed, in the present instant, of an outer facing strip 15 customarily of fibrous material and of a nature suitable for the purpose, a metal carrying strip 16 to which the facing strip is secured, and to the ends of which, at the inner sides thereof, are secured the thrust members or brackets 5. A reinforcing backing segment 17 of a rigid nature bears outward against the inner side of the carrying strip 16 intermediate the thrust members 5 and serves to maintain the shape of the carrying strip and to prevent a buckling thereof when an expanding pressure is applied thereto. The backing segment 17 is yieldingly held to the carrying strip 16 by a coiled expansion spring 18, which has its inner end-thrust against the backing segment and its outer end-thrust against a collar 19 carried at the outer end of a stud 20, said stud projecting centrally from a strip 16 through a registering opening 21 in said segment.

It is evident that I have provided a simple and efficient brake of the internal expanding type, which has double operating means, one of which is controlled from the service brake lever and the other from the emergency brake lever of a motor driven vehicle, and that one may be utilized as an adjustment for taking up wear or looseness in the parts.

I wish it understood that my invention is not limited to any specific construction, arrangement or form of the parts, as it is capable of numerous modifications and changes without departing from the spirit of the claim.

Having thus described my invention what I claim as new and desire to secure by Letters Patent is—

An internal expanding brake, comprising a drum, a pair of opposed segments internally of the drum at opposite sides of its axis, each segment comprising a segmental carrying strip, a fibrous facing strip applied thereto, a thrust member carried by the carrying strip at the inner side of each end portion thereof, a reinforcing backing member at the inner side of the carrying strip intermediate said thrust members, and means yieldingly retaining the reinforcing member in engagement with the carrying strip, an expanding cam between each set of opposed thrust members, and separate means connected to said cams and independently operable to effect an expansion of the segments.

In testimony whereof, I have hereunto signed my name to this specification.

GEORGE M. CARTER.